(12) United States Patent
Witchey

(10) Patent No.: US 8,010,789 B2
(45) Date of Patent: Aug. 30, 2011

(54) SECURE DATA TRANSFER USING AN EMBEDDED SYSTEM

(75) Inventor: Nicholas J. Witchey, Laguna Hills, CA (US)

(73) Assignee: Lantronix, Inc., Irvine, CA (US)

( * ) Notice: Subject to any disclaimer, the term of this patent is extended or adjusted under 35 U.S.C. 154(b) by 1315 days.

(21) Appl. No.: 10/896,088

(22) Filed: Jul. 21, 2004

(65) Prior Publication Data

US 2005/0108524 A1    May 19, 2005

Related U.S. Application Data

(63) Continuation-in-part of application No. 10/712,084, filed on Nov. 13, 2003.

(51) Int. Cl.
*H04L 29/06* (2006.01)

(52) U.S. Cl. ......................... 713/165; 713/189

(58) Field of Classification Search .................. 713/150, 713/153, 164–165, 189
See application file for complete search history.

(56) References Cited

U.S. PATENT DOCUMENTS

| | | |
|---|---|---|
| 4,789,847 A | 12/1988 | Sakamoto et al. |
| 4,972,470 A | 11/1990 | Farago ............................. 380/3 |
| 4,978,317 A | 12/1990 | Pocrass |
| 5,015,204 A | 5/1991 | Sakamoto et al. |
| 5,069,641 A | 12/1991 | Sakamoto et al. |
| 5,139,442 A | 8/1992 | Sakamoto et al. |
| 5,239,581 A | 8/1993 | Hane ................................ 380/3 |
| 5,282,759 A | 2/1994 | Sakamoto et al. |
| 5,587,884 A | 12/1996 | Raman |
| 5,647,765 A | 7/1997 | Haas et al. |
| 5,647,767 A | 7/1997 | Scheer et al. |
| 5,664,950 A | 9/1997 | Lawrence ..................... 439/76.1 |
| 5,805,706 A | 9/1998 | Davis ............................. 380/49 |
| 5,805,931 A | 9/1998 | Morzano et al. |
| 5,818,939 A | 10/1998 | Davis ............................. 380/49 |
| 5,896,499 A * | 4/1999 | McKelvey ..................... 726/11 |
| 6,038,233 A | 3/2000 | Hamamoto et al. |
| 6,047,319 A | 4/2000 | Olson .......................... 709/223 |
| 6,115,816 A | 9/2000 | Davis ........................... 713/153 |
| 6,118,784 A | 9/2000 | Tsuchiya et al. |
| 6,203,334 B1 | 3/2001 | Daoud et al. |
| 6,212,633 B1 | 4/2001 | Levy et al. ..................... 713/153 |

(Continued)

OTHER PUBLICATIONS

Tyco Electronics (2000), "Gigabit Ethernet Multimode SFP MT-RJ Transceivers", Catalogue 1308513, pp. 1-11.

(Continued)

*Primary Examiner* — Hosuk Song
*Assistant Examiner* — Suman Debnath
(74) *Attorney, Agent, or Firm* — Hani Z. Sayed; Rutan & Tucker, LLP

(57) ABSTRACT

A method and device for securing data transmission via an embedded system that is operationally coupled to a local device and a remote computing system using a network is provided. The method includes, determining if data received from the remote computing system is secured, handshaking with the remote computing system if the data received is from a new connection; decrypting the secured data; and transmitting the decrypted data to the local device. The method also includes, determining if the data received from the local device is from a new connection, handshaking with the remote computing system if the data received is from a new connection; encrypting the data; and transmitting the encrypted data to the remote computing system. A receiving module determines whether input data needs to be encrypted or decrypted; a processing module for encrypting and/or decrypting input data; and an output module for transmitting encrypted and/decrypted data.

5 Claims, 5 Drawing Sheets

U.S. PATENT DOCUMENTS

| | | | |
|---|---|---|---|
| 6,304,973 B1 | 10/2001 | Williams | 713/201 |
| 6,350,152 B1 | 2/2002 | Belopolsky et al. | |
| 6,381,283 B1 | 4/2002 | Bhardwaj et al. | |
| 6,478,611 B1 | 11/2002 | Hyland | |
| 6,978,318 B1 * | 12/2005 | Keller et al. | 709/250 |
| 6,981,140 B1 * | 12/2005 | Choo | 713/164 |
| 7,099,478 B2 * | 8/2006 | Tomlinson | 380/280 |
| 7,181,613 B2 * | 2/2007 | Boebert et al. | 713/153 |
| 7,246,233 B2 * | 7/2007 | Brabson et al. | 713/164 |
| 7,318,100 B2 * | 1/2008 | Demmer et al. | 709/229 |
| 2002/0087708 A1 * | 7/2002 | Low et al. | 709/231 |
| 2003/0014624 A1 * | 1/2003 | Maturana et al. | 713/151 |
| 2003/0191935 A1 * | 10/2003 | Ferguson | 713/153 |
| 2003/0194908 A1 | 10/2003 | Brown et al. | 439/620 |
| 2004/0104268 A1 * | 6/2004 | Bailey | 235/439 |

OTHER PUBLICATIONS

Network Working Group, http://www.ietg.org/rfc/rfc2766.txt printed on Jul. 26, 2002, 20 pages.

* cited by examiner

SECURE DATA TRANSFER USING AN EMBEDDED SYSTEM

CROSS REFERENCE TO RELATED APPLICATION

This patent application is a continuation-in-part of the patent application filed on Nov. 13, 2003, Ser. No. 10/712,084; the disclosure of which is incorporated herein by reference in its entirety.

BACKGROUND OF THE INVENTION

1. Field of the Invention

The present invention relates to embedded systems, and more particularly, to secured data transfer in embedded systems.

2. Background

In many cases an embedded system is deployed in the field and forgotten. Meanwhile technology evolves and changes around the deployed system. Older deployed systems have serial interfaces to gain access to the device and information it contains. As the Internet has become prevalent, users wish to access their devices without having to go personally to the device and plug in a computer to download data. Consequently, a demand arose to Internet enable the older devices by creating products that have a serial port on one end and an Ethernet port on the other end, which can accept the data from the device and send the data over the Internet. This is advantageous because it eliminates the need to do costly replacements for the device.

Embedded systems today can be connected to computer networks (for example, the Internet) and to legacy devices. These embedded systems allow connectivity with various equipment, legacy as well as state of the art. For example, an embedded system allows network/Internet connectivity to vending machines, refrigerators, utility meters, HVAC systems, and home entertainment systems.

Now that the Internet has been around for awhile, there are devices that are Internet enabled and are being used in the field. Just as the serial devices had limited resources and could not be upgraded easily, the older Internet devices also have limited resources and can not be upgraded cost effectively. The Internet has grown and with it security concerns have grown tremendously. There is now a need to upgrade Internet enabled embedded systems to include security capabilities such as encryption. However, the firmware on the devices cannot be upgraded because the processors in these embedded systems are underpowered and there are insufficient resources to run new and complex encryption software. Therefore there is a need for a low cost method for converting data from a device to a secure data stream.

SUMMARY OF THE INVENTION

In one aspect of the present invention, a method for securing data transmission via an embedded system that is operationally coupled to a local device and a remote computing system using a network is provided. The method includes: determining if data received from the remote computing system is secured, handshaking with the remote computing system if the data received is from a new connection; decrypting the secured data; and transmitting the decrypted data to the local device.

In yet another aspect, a method for processing insecure data using an embedded system that is operationally coupled to a local device and a remote computing system using a network is provided. The method includes: determining if the data received from the local device is from a new connection, handshaking with the remote computing system if the data received is from a new connection; encrypting the data; and transmitting the encrypted data to the remote computing system.

In yet another aspect, a device for securing data transmission between a local device and a remote computing system using a network is provided. The device includes: a receiving module that determines whether input data needs to be encrypted or decrypted; a processing module for encrypting and/or decrypting input data; and an output module for transmitting encrypted and/or decrypted data.

The receiving module determines if data received from the remote computing system is secured and the processing module de-crypts the secured data. The receiving module also determines if data received from the local device is from a new connection and the processing module encrypts data before data is sent to the remote computing system.

In one aspect of the present invention, an embedded system provides a legacy device the ability to receive and send secure data from a network. Also, plural legacy devices may be coupled with each other using pre-shared keys to communicate with each other.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

In one aspect of the present invention, embedded systems and methods used therewith are provided that incorporate all essential networking features, including a 10Base-T/100Base-TX Ethernet connection, an operating system, an embedded Web server, a full TCP/IP protocol stack and encryption capability for secure communications.

In one aspect of the presentation, a low cost and self contained device with a secured converter is provided. The device includes a connector having a male Ethernet connector and a female Ethernet port. Other embodiments could also be created such as a male Ethernet connector on one side and a wireless port (802.11b/a/g) on the other side. The connector is housed in a case of optimum size. The male connector plugs in to the existing Ethernet port of the legacy Internet enabled device and the Ethernet cable to the network plugs into the female Ethernet port.

Power to the connector may be supplied through a number of methods. For example, from an external supply similar to most embedded system; or from a universal serial bus ("USB") port if one exists; or through network supplied power.

The female connector "assumes" the media access controller ("MAC") address of the legacy device so that the embedded system appears as the legacy device itself. The female port also replicates the Internet Protocol ("IP") address of the legacy device. The male port presents itself as a cable so no configuration is required.

The embedded system includes an internal database used to determine which data to secure. The following information is used:
(a) The remote IP address to which the legacy device wishes to communicate with;
(b) The TCP/UDP port used for secure communication; and
(c) The protocol secured such as FTP, HTTP, or SMTP.
To secure data the following is used:
(a) Public and private keys;
(b) Protocol to use (SSL, SSH, or others); and
(c) Cipher suites for example, AES, DES, 3DES In one aspect of the present invention, the embedded system provides a secure communication channel between a legacy device and a remote host. Plural embedded systems may be configured so they can only communicate between themselves in a secure manner. If a remote host is a computer workstation, the embedded system can communicate with the remote using secure redirector software.

To facilitate an understanding of the preferred embodiment, the general architecture and operation of an embedded system will initially be described. The specific architecture and operation of the preferred embodiment will then be described with reference to the general architecture.

Figure 1A:
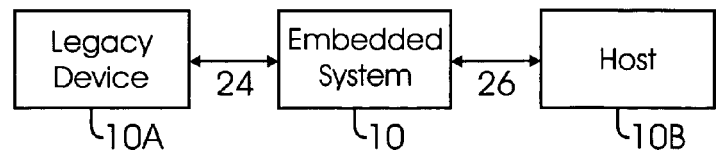
FIG. 1A shows a top-level block diagram showing connectivity between an embedded system, a local device and a remote host.

FIG. 1A shows an embodiment of the present invention that allows secured communication between an embedded system 10, a legacy device 10A and a remote host system 10B. An example of such system 10 is the XPort™ designed and sold by Lantronix Inc.®. Legacy device 10A in this example has limited intelligence, and may include a standalone vending machine, a microwave, a dishwasher or any other device that lacks basic computing ability.

Embedded system 10 receives and sends in-secure data 24 to/from local device 10A. Thereafter, data is secured by embedded system 10 and transmitted to a remote host 10B. In one aspect, data 26 is transmitted to remote host 10B via the Internet or any other network (for example, local area network and wireless network).

The following provides a brief description of the Internet that may be used to receive and send data using the embedded system 10:

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink. The web browser may run on any computer connected to the Internet. Currently, various browsers are available of which two prominent browsers are Netscape Navigator and Microsoft Internet Explorer. The Web Browser receives and sends requests to a web server and acquires information from the WWW. A web server is a program that, upon receipt of a request, sends the requested data to the requesting user.

A standard naming convention known as Uniform Resource Locator ("URL") has been adopted to represent hypermedia links and links to network services. Most files or services can be represented with a URL. URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Figure 1B:
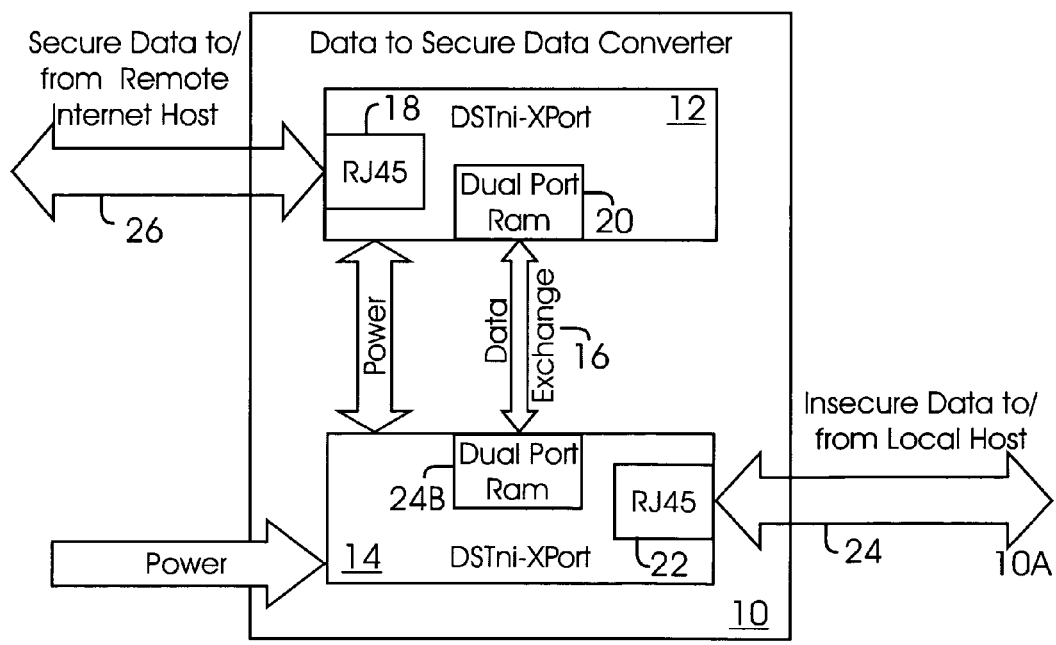
FIGS. 1B, 2 and 3 show block diagrams of various embodiments that can be used to execute the process steps, according to one aspect of the present invention.

FIG. 1B shows a block diagram of embedded system 10. System 10 includes two modular connectors 12 and 14. Connector 12 provides physical connectivity with remote host 10B and includes a RJ-45 jack 18. Connector 14 operationally couples system 10 with local device 10A and includes an RJ-45 jack 22.

Dual port random access memory 20 and 24B is provided to both connectors 12 and 14 to execute process steps, according to one aspect of the present invention. Data 24 is received from local device 10A and is moved to connector 14. Thereafter, data exchange 16 takes place between connector 14 and 12. In one aspect, data is secured in connector 12 and then transmitted as secure data 26. Data 24 may also be secured in connector 14 and exchange 16 delivers encrypted data 26.

Various techniques may be used to secure data 24, for example, the Secured Sockets Layer ("SSL") protocol; Secure Shell ("SSH") or the Advanced Encryption Standard ("AES"), which are incorporated herein by reference in their entirety or any other encryption standard or protocol.

AES employs 128-bit, 192-bit, or 256-bit keys in a standardized method (FIPS-197). However, AES can be used in number of different modes depending on the type of data flow one is dealing with. Embedded system 10 focuses on TCP data streams or UDP datagrams. For TCP, Cipher Feedback Blocks (CFB) are used to stream data. For UDP, Cipher Block Chaining (CBC) is used to send datagrams.

SSL is used widely for communication between a web browser and a web server in a secure fashion. SSL is a standardized protocol for establishing and maintaining a secure communication session (see RFCs 2246 and 3546). SSL handles most of the problems encountered with secure data communications. For instance, hosts are authenticated through trusted authorities, keys are exchanged securely, data is encrypted, and data is exchanged transparently to the application.

System 10 operates as an SSL client and server because the device it is connected to can initiate connections. SSL assumes a reliable transport mechanism such as TCP and is not useable with UDP. This means a CBD based encryption routine is required for UDP.

Secure Shell (SSH) is a secure mechanism for establishing a connection to remote internet host 10B. SSH is mainly used for command line (Telnet like) interface. However, it can also be used with other protocols to create secure communications like SFTP (secure file transfer protocol) or SCP (Secure copy). SSH also assumes a reliable transport mechanism such as TCP. SSH also supports the concept of port forwarding which is ideal for tunneling data through a secure connection (SFTP for instance).

The adaptive aspects of the present invention are not limited to any particular encryption/decryption technique, protocol or standard, although the examples herein have been illustrated with respect to the SSL protocol. System 10 may be configured to use any encryption technique, i.e., from SSL to SSH to AES.

In yet another aspect, secured data 26 is received from a remote host 10B by connector 12. Secured (or encrypted) data 26 is decrypted by connector 12 and then transferred to connector 14 via data exchange 16. Thereafter, decrypted data 24 is sent to local device 10A.

Depending upon where the encryption and/or decryption occurs (i.e. connector 12 and/or 14), executable process steps are executed out of RAM 20 and/or 24B.

In one aspect of the present invention, the process uses a processor in connector 12 and 14, as available in an Ethernet connector described in U.S. patent application Ser. No. 10/122,867 entitled "Compact Serial to Ethernet Conversion Port", filed on Apr. 15, 2002, the substance of which is incorporated herein by reference. The processor executes the encryption/decryption code out of RAM 20 and/24B.

It is noteworthy that if embedded system 10 does not have to provide a secure data channel, it merely passes TCP/IP packets from remote host 10B to device 10A.

Embedded system 10 can operate in two modes: (1) secures data coming from the legacy device 10A; and (2) converts secure data coming from a remote host 10B to normal data. In both modes, embedded system 10 processes data encapsulated within the TCP/UDP packages and hence, is intelligent enough to extract the data, encrypt it then patch it back into a packet and vice versa.

Figure 2:
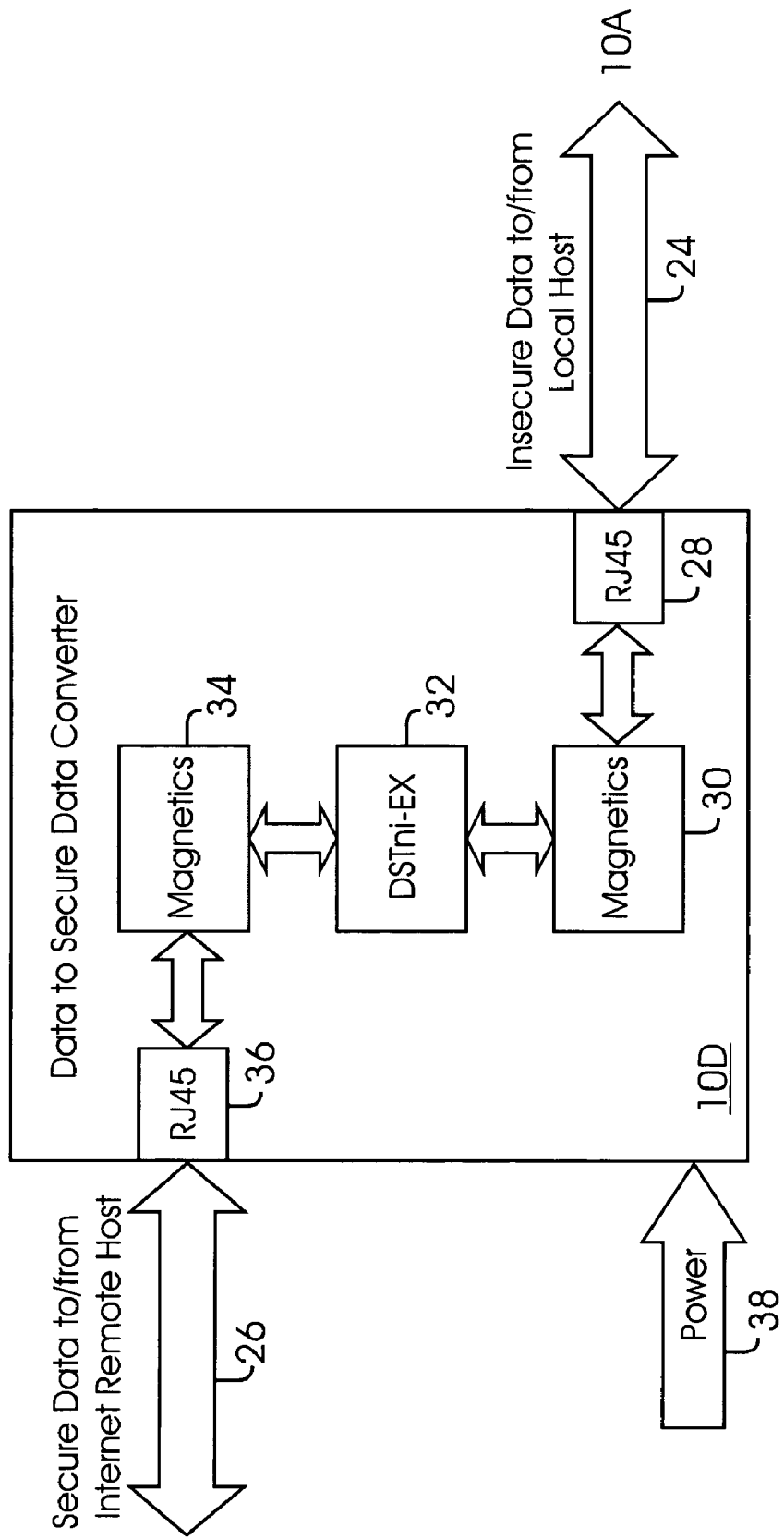

FIG. 2 shows a block diagram of another embodiment (system 10D) that can secure data transmission between device 10A and host system 10B. System 10D includes a microprocessor 32 used for securing data. An example, of one such processor 32 is DSTni-EX chip as commercially available from Lantronix, Inc. of Irvine, Calif. however, other processors may be used to execute the process steps. Processor 32 uses embedded executable process steps to encrypt and de-crypt data, according to one aspect of the present invention. Magnetics 34 and 30 are used to manipulate data signals as received from remote host 10B and device 10A.

Figure 3:
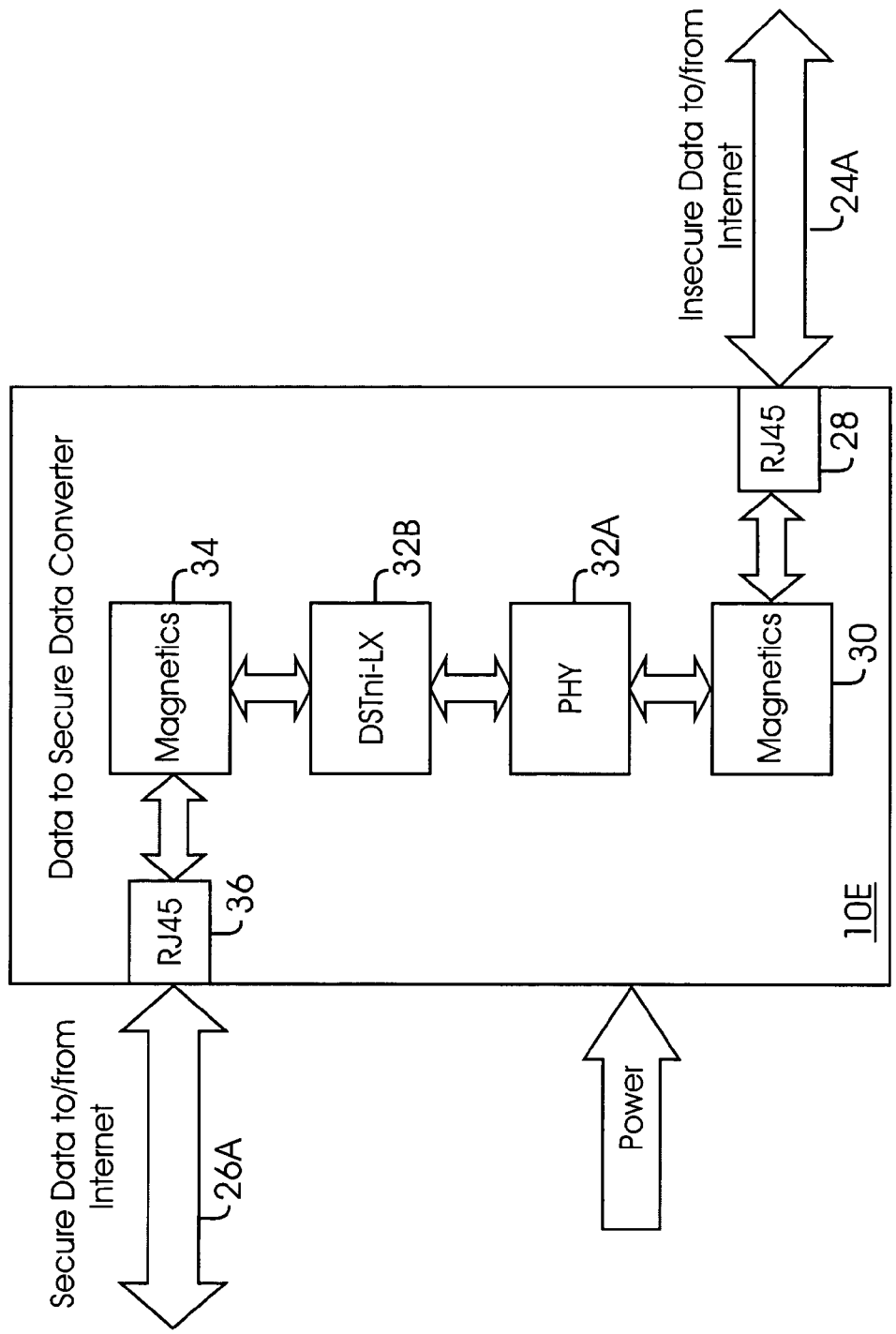

FIG. 3 shows another embodiment for implementing the executable process steps, according to one aspect of the present invention. System 10E is coupled to a network, for example, the Internet at jacks 28 and 36. Insecure data 24A is received from the network and secured data 26A is sent to the network, or vice-versa. System 10E uses a processor DSTni-LX 32B that is commercially available by Lantronix, INC. of Irvine, Calif. A physical interface (PHY) 32A is provided to enable processor 32B for processing input and output signals.

The embodiments shown in FIGS. 1B, 2 and 3 (without the processing module 38 (FIG. 4) for securing data) are described in the patent application Ser. No. 10/712,084, filed on Nov. 13, 2003, incorporated herein by reference in its entirety.

Figure 4:
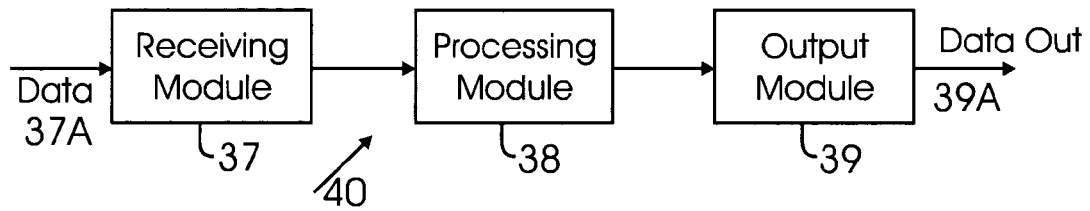
FIG. 4 shows a top-level system architecture for encrypting/decrypting data, according to one aspect of the present invention.

FIG. 4 shows a top-level architecture of a system 40 for encrypting and decrypting data, according to one aspect of the present invention. System 40 may be modular as shown in FIG. 4 or integrated as a single piece of code. System 40 may be executed out of RAM 20 and/or 24, and/or processor 32 and/or 32B.

System 40 includes a receiving module 37 that receives input data 37A (for example, insecure data 24 and/or 24A, and secured data 26 and/or 26A). Input data 37A may be of any format, for example, TCP/IP (Transmission Control Protocol/Internet protocol, incorporated herein by reference in its entirety), UDP (user datagram protocol standard, incorporated herein by reference in its entirety), wireless, Fibre Channel or any other networking standard/protocol. Receiving module 37 determines whether the input data 37A needs to be encrypted or decrypted depending again on the direction of data flow. Processing module 38 then encrypts or decrypts the data by using well-know encryption and/or decryption techniques. Output module 39 then moves the encrypted/decrypted data 39A for transmission.

Figure 5:
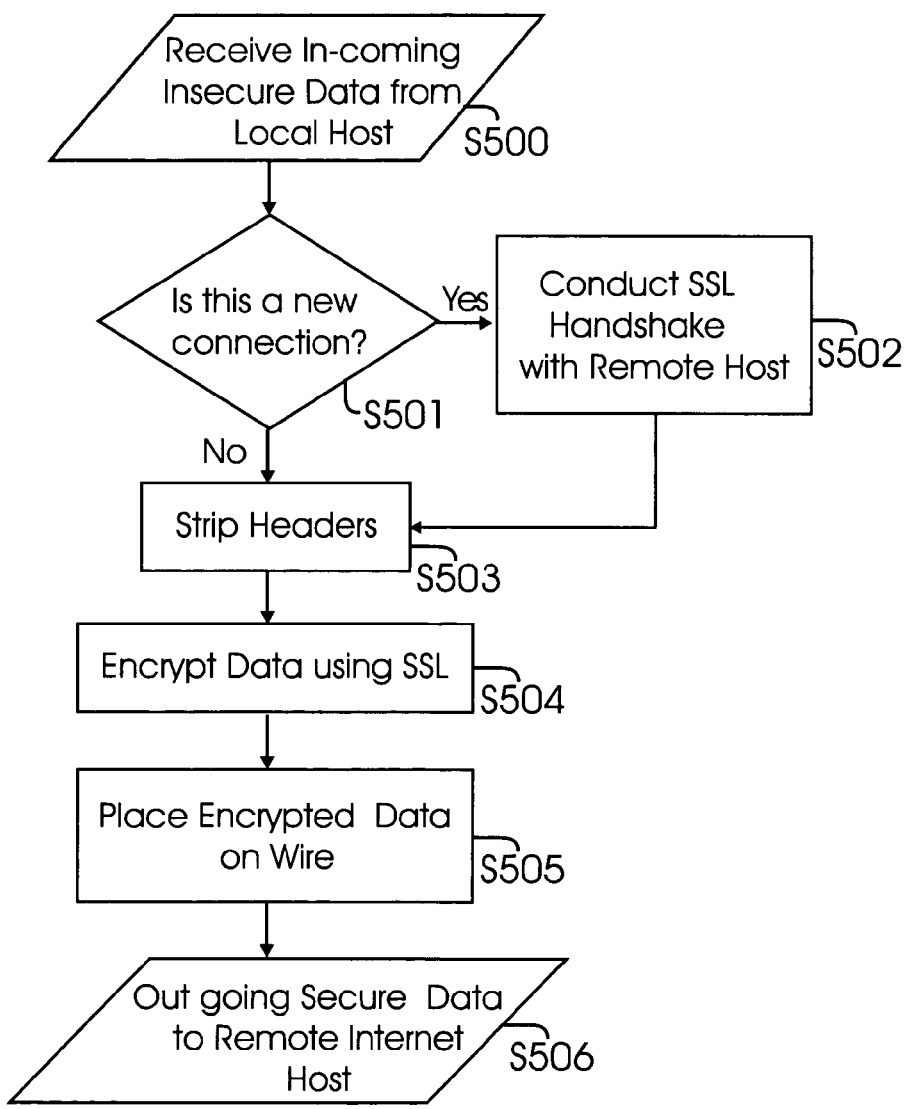
FIGS. 5 and 6 show process flow diagrams for executing process steps, according to one aspect of the present invention.

FIG. 5 shows a process diagram for executing process steps, according to one aspect of the present invention, for moving data from local device 10A to remote host 10B.

In step S500, the process determines if input data (24 and/or 24A, also shown as 37A in FIG. 3) is received from a local device (10A). The receiving module 37 performs this task.

In step S501, the process determines if the input data is being received from a new connection. If yes, then in step S502, the process conducts a handshake with the remote host 10B. The process can use the SSL handshake or another similar technique.

In step S503, the headers for input data are stripped. Processing module 38 may perform this task. In step S504, the process encrypts the input data using SSL protocol or any other encryption technique.

In step S505, the encrypted data is placed on the wire for transmission and in step S506, secured data (26 and/or 26A) is sent to remote host 10B.

Figure 6:
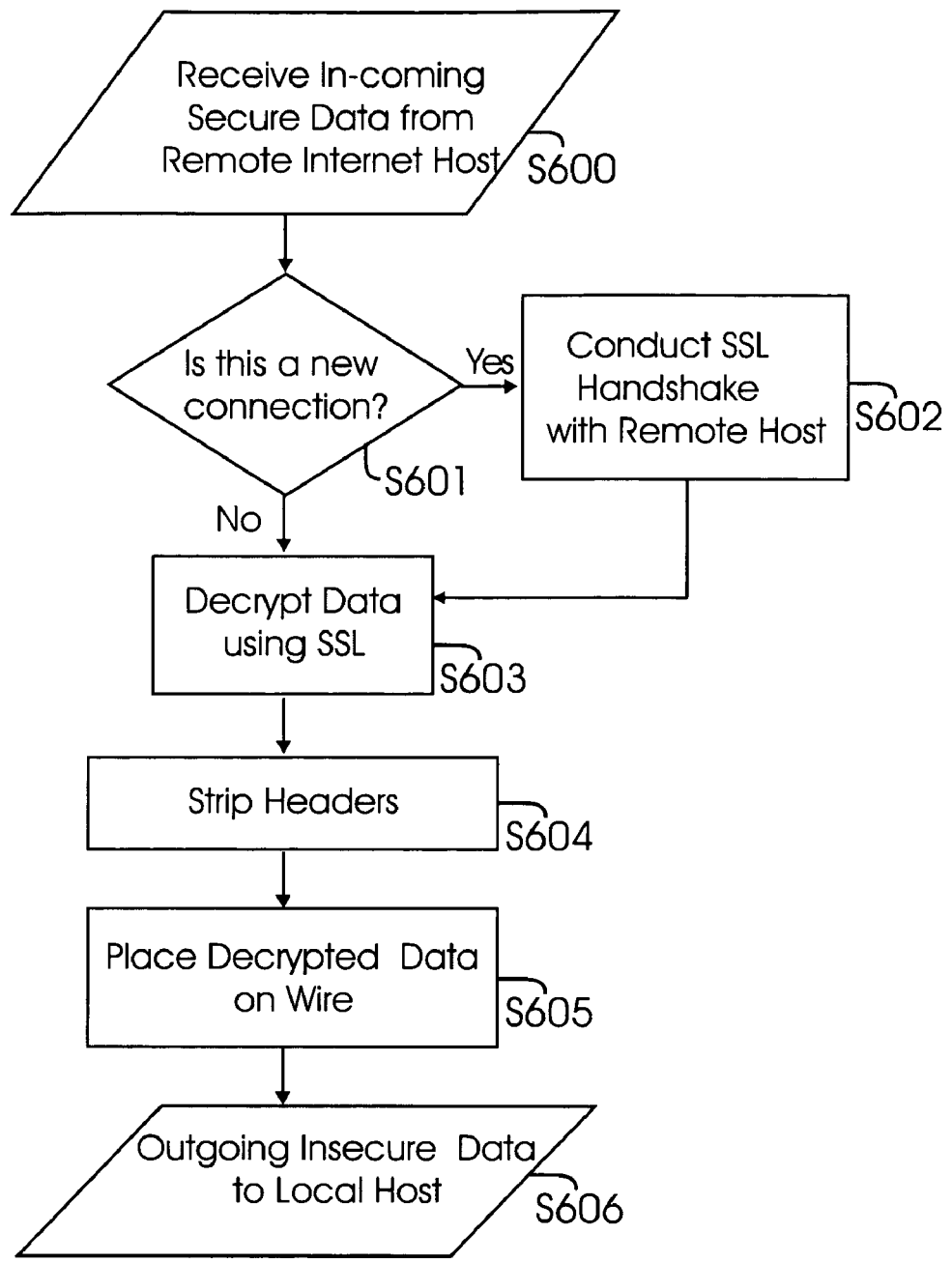

FIG. 6 shows a process flow diagram for processing secured data that is received from remote host 10B, shown as 26 and/or 26A and also as 37A in FIG. 3.

In step S600, data is received from remote host 10B. Receiving module 37 receives the data from remote host 10B via a network (the Internet).

In step S601, the process determines if the input data is from a new connection. If yes, then in step S602, the process conducts a handshake with remote host 10B.

In step S603, the process decrypts the secured data. Data processing module 38 decrypts the data using processor 32 and/or 32B.

In step s604, the process strips the headers and the decrypted data is placed on the wire for transmission (in step S605). Thereafter, in step S606, decrypted data is sent to local host (or legacy device) 10A.

It is noteworthy that although the foregoing description has used Ethernet to illustrate the adaptive aspects of embedded system 10, an Ethernet to Wireless implementation may also be used to secure data.

In one aspect of the present invention, a portable embedded system provides a legacy device the ability to receive and send secure data from a network. Also, plural legacy devices may be coupled with each other using pre-shared keys to communicate with each other.

In one aspect of the present invention, the embedded system described above can be used with legacy systems that have a web server interface, including paired systems, like point of sales systems and a remote inventory system. The embedded system described herein can also be used to secure network applications in public utilities.

While the present invention is described above with respect to what is currently considered its preferred embodiments, it is to be understood that the invention is not limited to that described above. To the contrary, the invention is intended to cover various modifications and equivalent arrangements.

What is claimed is:

1. A method for securing data transmission via an embedded system that is operationally coupled to a local device and a remote computing system using a network, comprising:

providing at least a first connector and a second connector whereby the first connector provides physical connectivity with a remote host and includes an RJ-45 jack and further whereby the second connector couples system with a local device; the first and second connectors determine when data received from the remote computing system is secured; the first and second connector have random access memory wherein at least one of the first connector or second connector identifies the media access controller address of a local device so that an embedded system appears as the legacy device itself;

providing an internal database which is used to determine which data to secure;

handshaking with the remote computing system when the data-received is from a new connection;

decrypting secured data utilizing a data exchange wherein decryption techniques are based on SSL, SSH and AES standards;

stripping data headers before being sending to the remote computing system; and transmitting the decrypted data to the local device via a connector.

2. The method of claim 1, wherein data headers are stripped before being sent to the local device.

3. The method of claim 1, wherein the received data is based on TCP format.

4. The method of claim 1, wherein the received data is based on UDP format.

5. The method of claim 1, wherein decryption techniques are based on SSL, SSH and AES standards.

* * * * *